United States Patent [19]

Fritsche et al.

[11] 4,163,148
[45] Jul. 31, 1979

[54] AUTOMATIC FOCUSING DEVICE PROBE COMPRISING A FOCUSING DEVICE AND METHOD OF FOCUSING A PROBE

[75] Inventors: Rainer Fritsche; Helmut Ringelhan, both of Wetzlar, Fed. Rep. of Germany

[73] Assignee: Ernst Leitz Wetzlar GmbH, Wetzlar, Fed. Rep. of Germany

[21] Appl. No.: 878,454

[22] Filed: Feb. 16, 1978

[30] Foreign Application Priority Data

Feb. 26, 1977 [DE] Fed. Rep. of Germany ....... 2708507

[51] Int. Cl.² .............................................. G01V 1/20
[52] U.S. Cl. ................................. 250/201; 350/96.26
[58] Field of Search ................... 250/201, 204, 214 P, 250/237 R, 237 G; 354/25; 350/96.26

[56] References Cited

U.S. PATENT DOCUMENTS

| 3,953,729 | 4/1976 | Hosoe et al. ............................ 354/25 |
| 4,070,116 | 1/1978 | Frosch et al. .......................... 250/201 |

Primary Examiner—David C. Nelms
Attorney, Agent, or Firm—Schwartz, Jeffery, Schwaab, Mack, Blumenthal & Koch

[57] ABSTRACT

An automatic focusing device is disclosed which focuses an object onto an image plane. The device comprises an optical correlator which includes: a first focusing member, an optical fiber means, a grating structure and photoelectric receiving means. The device further comprises control means, motor means, and means for adjusting the first focusing means.

A probe is disclosed which comprises an elongated tubular member; a first focusing means; an optical fiber bundle; a grating structure; photoelectric receiving means; means for focusing light received from the grating structure; and display means for electrically displaying the position of the probe.

Also, a method of determining optimum focus position of a probe is disclosed which comprises passing the light image of an object through a bundle of optical fibers in the probe to form an image of the object. Light leaving the bundle is directed onto a grating having a grating constant such that the spatial frequency spectra of the fibers and of the grating do not overlap. The optical correlation between the object image and the structure are then determined and the probe is adjusted based upon electrical signals derived from the optical correlation.

9 Claims, 8 Drawing Figures

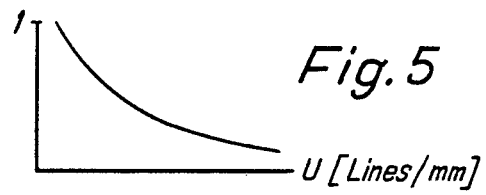
Fig. 3
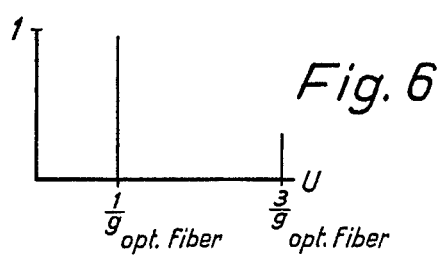
Fig. 4
Fig. 5
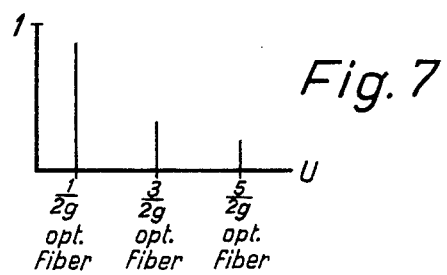
Fig. 6
Fig. 7
Fig. 8

4,163,148

AUTOMATIC FOCUSING DEVICE PROBE COMPRISING A FOCUSING DEVICE AND METHOD OF FOCUSING A PROBE

BACKGROUND OF THE INVENTION

1. Field of the Invention

The invention relates to an image transmission device for examining inaccessible parts of an object, for example channel-like parts of an object or other hollow spaces, having at least one structural group for conducting image information, and further having at least one focusable member as well as a focusing device coordinated with it.

2. Description of the Prior Art

A structural group for conducting image information via optical lenses arranged in series is disclosed by U.S. Pat. No. 3,608,998 (corresponding to German Pat. No. 1,566,112).

U.S. Pat. No. 3,010,357 (corresponding to German Gebrauchmuster 1,853,607; and German Pat. No. 1,269,287 disclose forming a structural group from glass fibers or other optically conducting fibers. These publications further disclose providing at least one focusable member within the structural group for focusing the group on the part of the object to be examined.

However, it is a disadvantage of such mechanical focusing devices that in spite of apparently sharp images in the viewfinder, photographic images made through such devices yield unsharp images. This occurs because during the visual observation of the part of the object, the image appears to be sharp to the observer at all distances, due to the automatic accomodation of his eyes.

Another disadvantage is that the distance of a part of an object observed or photographed cannot be determined accurately with known devices. This, however, is necessary when similar parts of objects are to be reproduced for comparative purposes on the same scale.

A device described in German Pat. Auslegensschrift No. 1,766,853 produces an electric signal as a function of the distance between the object and the device, by way of a photoelectric element, based on the light intensity reflected by the object. The signal is conducted to a calibrated recording or display device so that distance can be measured. To produce the reflection, light from a source of light with spectral characteristics such that the light emitted by it and reflected from the object will not affect the film intended for the generation of photographic images, is required. This technique interferes with the usefulness of the device because it renders the device subject to special preconditions.

Devices for the determination of distances are also known from German Pat. No. 2,156,617 and German Pat. No. 2,330,940 (corresponding to allowed U.S. application Ser. No. 673,726 and U.S. Pat. No. 3,781,110 respectively). With these devices, the location of at least one image plane of an imaging system can be determined by the principle of optical correlation. However, when the image plane determination technique described in these publications is to be used in combination with optical conductors having a grid structure over their cross section, a problem arises in that this grid structure hinders or renders impossible the filtering of the spatial frequencies present in the object. Specifically, this results in the phase relationship of the signals generated being lost during image transmission by means of such an optical conductor.

SUMMARY OF THE INVENTION

It is, therefore, the object of the present invention to provide an image transmission device for the examination of inaccessible parts of objects.

It is a further object of the invention to provide a device which automatically determines the distance between the object and the device and is equipped for this purpose with another device operating by the optical correlation principle, and constructed such that the grating structure of the optical conductor does not interfere with the filtering of spatial frequencies.

The above objects are fulfilled by means of the apparatus and method of the invention.

According to the invention an automatic focusing device is disclosed for focusing an object onto an image plane. The device comprises:

(a) an optical correlator comprising an optical system including: a focusing means for imaging said object into an image plane; optical fiber means aligned with said first focusing means and positioned to receive light therefrom; a grating structure positioned at least in the vicinity of said image plane of said optical system or a plane conjugate thereto; and aligned for receiving light from said optical fiber means, the constant of said grating structure having a spatial frequency matched at least to a spatial frequency component contained in the spatial frequency spectrum formed by the structures of said object image; photoelectric receiving means positioned to receive light from said grating structure for converting said light into electrical signals indicative of the position of said object;

(b) control means responsive to said electrical signals for providing motor control signals;

(c) motor means connected to receive said motor control signals from said control means; and (d) means for adjusting said first focusing means, said adjusting means connected to said motor means for focusing an image of said object onto said image plane.

The inventive focusing technique may be advantageously used in conjunction with a probe for examining an object such as an object within a hollow channel or bore. The probe in this case comprises:

(a) an elongated tubular member adapted to be inserted into said channel or bore;

(b) a first focusing means positioned within said tubular member proximate one end thereof for permitting positioning of said first focusing means adjacent said object to be examined;

(c) an optical fiber bundle positioned within said tubular member and aligned for receiving light from said object via said first focusing means;

(d) a grating structure positioned for receiving an image of said object, said grating structure having a grating constant whose spatial frequency is matched to at least one spatial frequency component of the spatial frequency spectrum contained in the structures of said object image;

(e) photoelectric receiving means for providing electrical output signals in response to light resulting from said object image and emanating from said grating structure;

(f) means for focusing light from said grating structure onto said photoelectric receiving means; and (g) display means connected to receive said electrical output signals for providing a display of the position of said probe, whereby said probe may be positioned for providing a display of maximum light amplitude indicating a maximum focusing condition of said probe.

Furthermore, the invention provides for a method of determining an optimum focus condition of a probe positioned adjacent an object under examination and having an optical system including an elongated optical fiber bundle of grating constant $G_{op.fib.}$. The method comprises the steps of:

(a) passing light through the probe, including said optical fiber bundle, to form an object image;

(b) directing said light from said bundle onto a grating structure having a grating constant $g_{grating}$;

(c) selecting said grating constants $g_{grating}$ and $g_{op.fib.}$ such that the spatial frequency spectra of said fiber bundle and said grating do not overlap;

(d) determining the maximum degree of optical correlation between said object image and said grating structure; and (e) adjusting said probe in response to electrical signals derived from said optical correlation to achieve an optimum focus.

BRIEF DESCRIPTION OF THE DRAWINGS

FIGS. 3 and 4 show the divisions of an amplitude grating structure and the cross section of the optical conductor to illustrate the magnitudes which must be coordinated with each other;

FIG. 5 diagramatically illustrates the amplitude variation of the spatial frequencies in the plane of the optical conductor;

FIG. 6 is an amplitude distribution diagram of the Fourier transform of the optical conductor grating structure;

FIG. 7 is an amplitude distribution diagram of the Fourier transform of the grating division; and FIG. 8 shows the amplitude distribution diagram which results from the correlation of the object and the grating.

DESCRIPTION OF THE PREFERRED EMBODIMENTS

The device and method of the invention solve the problems of the prior art by generating electric signals necessary for the sharp focusing of the image of the portion of an object under observation. The focusing device itself comprises an optical correlator as a sensor. The correlator includes an imaging system with at least one aperiodic, irregular, and in special cases uniformly regular grating structure arranged at least in the vicinity of the image plane or a plane conjugated with the latter. A photoelectric receiver system is coordinated with the grating structure, said sensor serving to produce electric output signals from the light flux emanating from the parts of the object and carrying information concerning the position of the object. After evaluation by an electronic evaluating device and, optionally, after amplification and/or transformation, the signals are conducted to a control device to regulate the focusable member.

In another development of the invention it is proposed that the optical structural group contain a bundle of optically conducting fibers and that the division of the grating structure of the sensor be adapted both to the structure of the part of the object to be examined and to the additional structure given by the cross section of the bundle of optical fibers overlaying the image of the object.

It is particularly advantageous to perform the adaptation of the grating structure and the additional structure presented by the cross section of the bundle of optical fibers by letting the extreme values of the Fourier transform of the structure of the bundle of optical fibers overlap with the zero positions of the Fourier transform of the grating structure. The device of the invention evaluates the maximum amplitudes of the electric signals generated by the sensor to determine the position of the object. The phase relationships of the signals would, under these circumstances, normally be lost during transmission through the optically conducting fibers.

To preserve these phase relationships, it is a further feature of the invention to have the optical correlator contain, in addition to the imaging system, for the additional imaging of the same part of the object, another optical system, which has its own coordinated bundles of optical fibers within the optical structural groups and to provide means to evaluate the electric signals produced by the images of the two imaging systems with respect to their phases.

Figure 1:
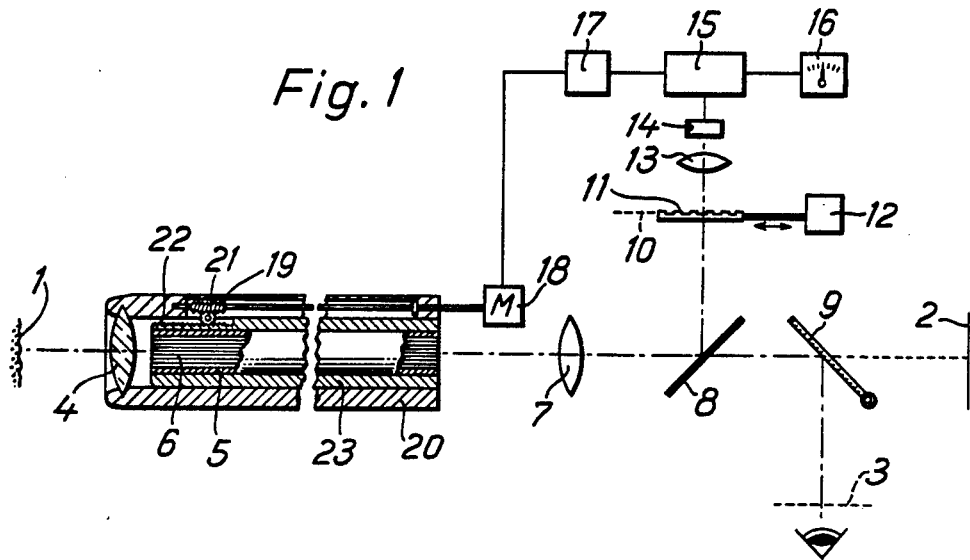
FIG. 1 illustrates an image transmission device in accordance with the invention having signal amplitude evaluation.

As may be seen from FIG. 1 a part of an object 1, which is to be reproduced in film plane 2 of a photographic camera, not shown, or in the image plane 3 in sharp focus for visual observation, is reproduced by an objective lens 4 and the image transmitted to a beam splitter by means of an optical conducting fiber bundle 6 enclosed by the sheathing 5 and an optical correction element 7. The portion of the light penetrating the beam splitter 8 passes either directly to the film plane 2 or through a rotating beam deflector 9 into the image plane 3 intended for visual observation. The portion of the light deflected by the beam splitter 8 images the part of the object 1 in a plane 10 conjugated with the film plane 2. An optical filter 11 is arranged in the vicinity of the plane. This filter possesses, for example, an effective grating structure in the form of an amplitude grating which is moved in the direction of the double arrow by a drive 12.

The light fluxes from the spatial frequency spectrum of the object image after being filtered are again concentrated by an optical collector element 13 onto a photoelectric receiver system 14, which, under this impingement, generates electric signals containing information concerning the position of the object part 1.

An electronic evaluating device 15 examines the signals of the photoelectric receiver system passed on to it with respect to the magnitude of their amplitudes. The amplitudes attain a maximum value when the part of the object 1 to be imaged is reproduced sharply in the planes 2 and 3. The electronic evaluating device 15 is connected to a display instrument 16. The electronic evaluator 15 is further connected to a control unit 17 which provides motor control signals which regulate servomotor 18.

Rotation of the servomotor 18 drives a worm drive 19 which is supported rotatably in a slide sheath 20 and powers a worm gear 21. The teeth 22 of a tubular drive element 23, connected solidly with the sheating 5 of the bundle of optically conductor fibers 6, mesh with the worm gear 21 so that the objective lens 4, carried by the slide sheath 20, can be shifted for focusing.

Figure 2:
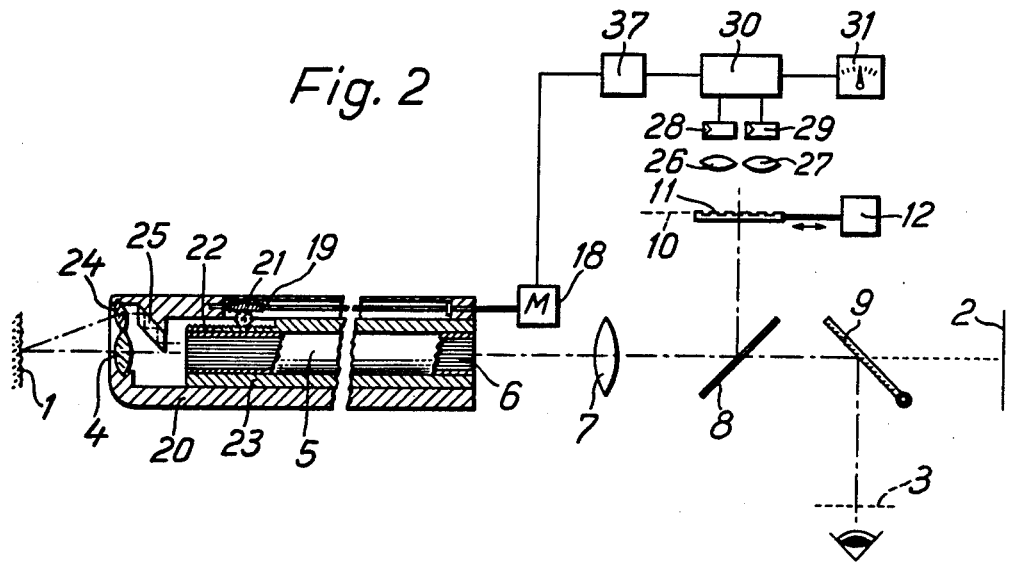
FIG. 2 shows an image transmission device according to the invention having signal phase evaluation.

FIG. 2 shows an embodiment similar to that of FIG. 1 except that in this case the phase information, i.e. the information of the parallaxis, is preserved.

For this reason, at least one additional objective 24 is arranged within the slide sheath 20, in addition to the objective lens 4. This additional objective lens 24 reproduces a further image of the part of object 1 to be focused sharply, which is conducted by way of an optical deflecting element 25 to defined portions 6' (FIG. 4) of the optically conducting fiber bundle 6. Together with the image of the objective 4, the additionally generated image passes through the optical correction element 7 and the beam splitter 8 in the plane 10 conjugated with the film plane 2 and is there subjected to the same optical filtering through the grating structure 11 as is the case with the image of the objective 4. The filtered light fluxes of the two images are conducted by the collector lenses 26 and 27 to the photoelectric receiver systems 28 and 29. The output signals of these receivers are evaluated in an electronic structural group 30 with respect to their mutual phase relationship. The result is made visible by a display device 31. The objective 4 and the additional objective 24 are focused by a system comprising a control unit 37, servomotor 18, worm drive 19, worm gear 21 and tubular drive element 23.

Naturally, it is also possible to use other optical devices, such as, for example, systems of mirrors or prisms, which generate one or several additional images of the object to be examined without supplemental objectives. For example, the objective 24 may be eliminated by using another prism in place of the prism 25 for selecting a portion of the light flux leaving the objective 4 (which corresponds to the position of a definite part of the object portion 1) and conducting it to the optically conducting fibers 6'. Under certain conditions, it then may become necessary, depending on the design of the structural elements, for the additional images to provide mechanical diaphrams to insure that visual observation, photographic reproduction and the measurements do not interfere with each other.

The process, proceeding in the space defined by the coordinate directions, x,y,z during relative motion between the image of the object and the grating structure and described as an optical correlation, can be represented in the frequency space—the Fourier space—as the multiplication of the Fourier transform of the grating transparency and the Fourier transform of the radiation density distribution of the object.

To optimize the evaluation, the grating structure must be designed so that the extreme values of the Fourier transform of the fiber transparency coincide with zero positions of the Fourier transform of the filter function. By suitably selecting the optical parameters, for example, the scale of reproduction and grating constants, the maximum spatial frequencies of the object can be made to avoid falling within the area of such zero positions. However, such measures are not necessary in the case of numerous natural objects, because they possess broad spatial frequency spectra.

FIGS. 5 to 8 illustrate a simplified example of the calculation of the coordination of the grating structure 11 which acts as an optical filter, with the additional grating structure in the cross section of the optical conductor fiber bundle 6. The calculation is based on an amplitude grating in accordance with FIG. 3 having a grating constant $g_{opt.filter}$ and an optical conductor fiber cross section according to FIG. 4 with a periodic grating constant of $g_{fiber}$. For simplicity, it is assumed that the core fibers are transparent and the adhesive and the jacketing fibers opaque. Due to the modulation transfer function, with high spatial frequencies the amplitude of the spatial frequency of the portion of the object to be observed 1 decreases in the plane of the end of the optical conductor fiber bundle facing and adjacent to the objective 4 and the additional objective 24. This process is represented in the diagram of FIG. 5. For a periodic grating structure 11 in the form of an amplitude grating, a spectrum with spatial frequencies at $$U = 1/g(2n-1)$$

where,

U = spatial frequency g = grating constant n = a natural number is obtained as the Fourier transform. This corresponds to the Fourier series of a rectangular grating whose amplitudes decrease by a factor of $(2n-1)$.

For the Fourier transform of the additional grating structure formed by the optical conductor fiber bundle 6 with $g = g_{fiber}$, a distribution of the amplitude maxima is obtained which is illustrated in FIG. 6.

The Fourier transform of the grating structure 11 in the form of an amplitude grating also yields an amplitude distribution as shown in the diagram of FIG. 6, because the initial function for $g_{fiber}$ described above again involves a grating in the form of an amplitude grating, having a grating constant, $g_{opt.filter}$, which equals $g_{fiber}$ of the grating structure of the optical conductor fiber cross section. The grating constant ($g_{opt.filter}$) of the grating structure 11 acting as an optical filter may be selected so that its maxima do not coincide with the maxima of the grating of the optical conductor fiber bundle 6. In the case of the variation represented by the diagram of FIG. 7, 2x was chosen as the constant of the grating structure 11 acting as an optical filter. Generally, $2n$ or $\frac{1}{2}n$ times the value of $g_{fiber}$ can be selected.

Multiplication of the spectra according to FIGS. 5 and 7 results in a spatial frequency distribution as shown in the diagram of FIG. 8. The width of the individual amplitude maxima occurring is, among other things, a function of the number of the grating lines found in the field of vision. In view of what has been said it should be clear that if the constant of the grating structure acting as an optical filter is coordinated, the supplementary grating structure of the optical conductor fiber bundle 6 cannot simulate an object so that interference with the automatic setting of the portion of the object 1 in an image plane of the objective 1 and of the additional objective, is prevented.

We claim:

1. An automatic focusing device for focusing an object onto an image plane comprising:
   (a) an optical correlator comprising an optical system including: a first focusing means for imaging said object into an image plane; optical fiber means aligned with said first focusing means and positioned to receive light therefrom; a grating structure positioned at least in the vicinity of said image plane of said optical system or a plane conjugate thereto, and aligned for receiving light from said optical fiber means, the constant of said grating structure having a spatial frequency matched at least to a spatial frequency component contained in the spatial frequency spectrum formed by the structures of said object image; photoelectric receiving means positioned to receive light from said grating structure for converting said light into electrical signals indicative of the position of said object;
(b) control means responsive to said electrical signals for providing motor control signals;
(c) motor means connected to receive said motor control signals from said control means; and
(d) means for adjusting said first focusing means, said adjusting means connected to said motor means for focusing an image of said object onto said image plane.

2. An automatic focusing device as recited in claim 1 wherein said optical fiber means comprises a bundle of optical fibers having a cross section which is relatively small in relation to the length of said bundle.

3. An automatic focusing device as recited in claim 1 wherein the grating constant of said grating structure is additionally matched to the grating constant of said bundle for inhibiting spurious focusing of said device.

4. An automatic focusing device as recited in claim 1 wherein the matching of said grating constant of said grating structure with said grating constant of said bundle is performed by having the maximum values of the Fourier transform of said bundle coincide with the minimum values of the Fourier transform of said grating structure.

5. An automatic focusing device as recited in claim 1 wherein:
(a) said optical system of said optical correlator is provided with a second focusing means for additionally imaging said object into said image plane and wherein defined portions of said fiber means are operatively associated with said second focusing means;
(b) deflecting means for directing light from said object to said defined portions of said fiber means, said defined portions of said fiber means positioned for directing light onto said grating structure;
(c) photoelectric receiving means for receiving light resulting from the object images of said first and second focusing means and emanating from said grating structure and for converting same into electrical signals;
(d) electrical means for determining the phase relationship of said electrical signals and for deriving from said phase determination further electrical signals; and
(e) said control means connected to receive said further electrical signals to provide said motor control signals to said motor means.

6. An automatic focusing device as recited in claim 5 wherein said second focusing means is positioned proximate said first focusing means and said means for adjusting said first focusing means is adapted to also adjust said second focusing means.

7. An automatic focusing device as recited in claim 1 wherein said first focusing means comprises an objective lens.

8. A probe for examining an object such as an object within a hollow channel or bore comprising:
(a) an elongated tubular member adapted to be inserted into said channel or bore;
(b) a first focusing means positioned within said tubular member proximate one end thereof for permitting positioning of said first focusing means adjacent said object to be examined;
(c) an optical fiber bundle positioned within said tubular member and aligned for receiving light from said object via said first focusing means;
(d) a grating structure positioned for receiving an image of said object, said grating structure having a grating constant whose spatial frequency is matched to at least one spatial frequency component of the spatial frequency spectrum contained in the structures of said object image;
(e) photoelectric receiving means for providing electrical output signals in response to light resulting from said object image and emanating from said grating structure;
(f) means for focusing light from said grating structure onto said photoelectric receiving means; and
(g) display means connected to receive said electrical output signals for providing a display of the position of said probe, whereby said probe may be positioned for providing a display of maximum light amplitude indicating a maximum focusing condition of said probe.

9. A method of determining an optimum focus condition of a probe positioned adjacent an object under examination and having an optical system including an elongated optical fiber bundle of grating constant $g_{op.-fib.}$, comprising the steps of:
(a) passing light through said probe, including said optical fiber bundle to form an image of said object;
(b) directing said light from said bundle onto a grating structure having a grating constant $g_{grating}$;
(c) selecting said grating constant $g_{grating}$ and $g_{op.fib.}$ such that the spatial frequency spectra of said fiber bundle and said grating do not overlap;
(d) determining the maximum degree of optical correlation between said object image and said grating structure; and
(e) adjusting said probe in response to electrical signals derived from said optical correlation to achieve an optimum focus.

* * * * *